Nov. 6, 1928.
C. E. DRESSLER
1,690,671
BLOOD PRESSURE APPARATUS
Filed May 9, 1927   2 Sheets-Sheet 1
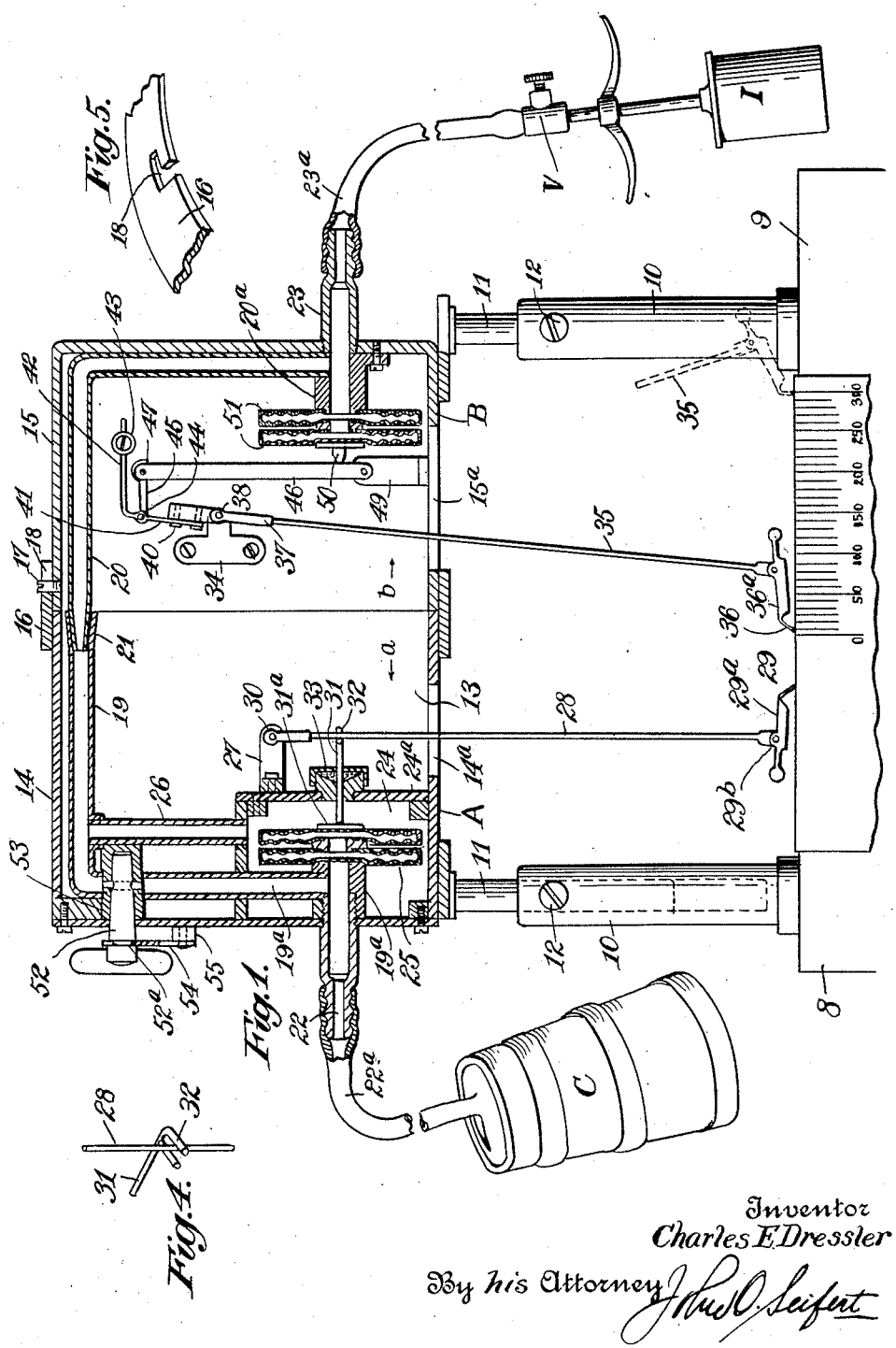
Inventor
Charles E Dressler
By his Attorney

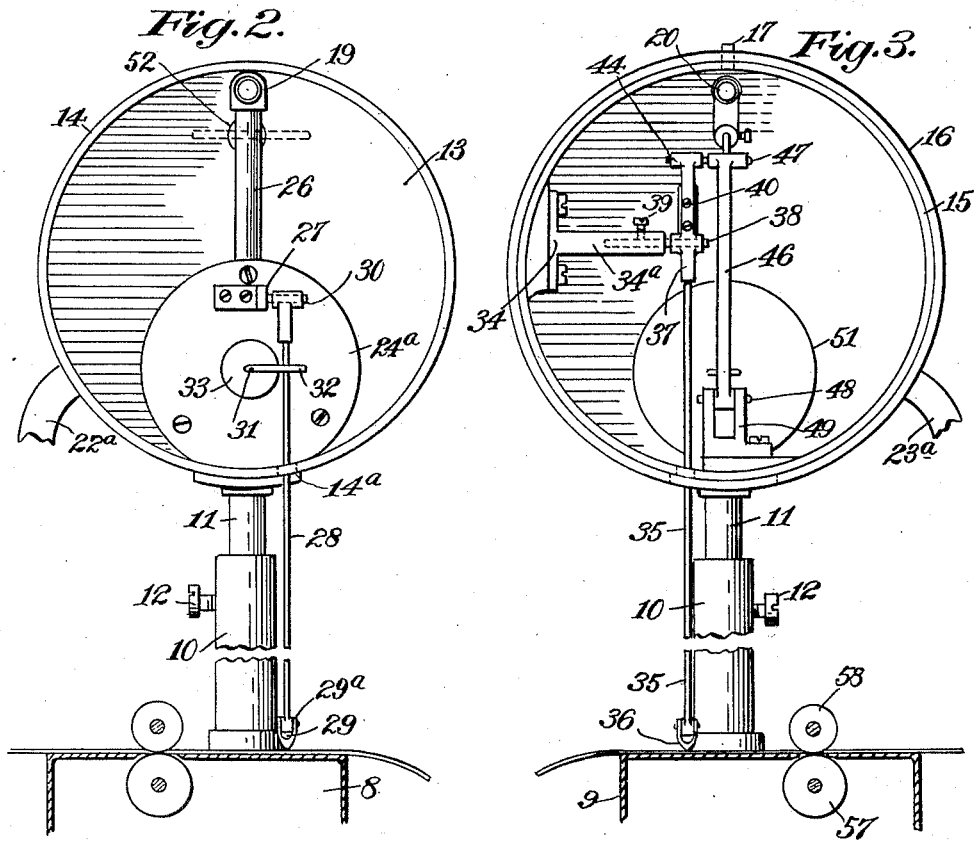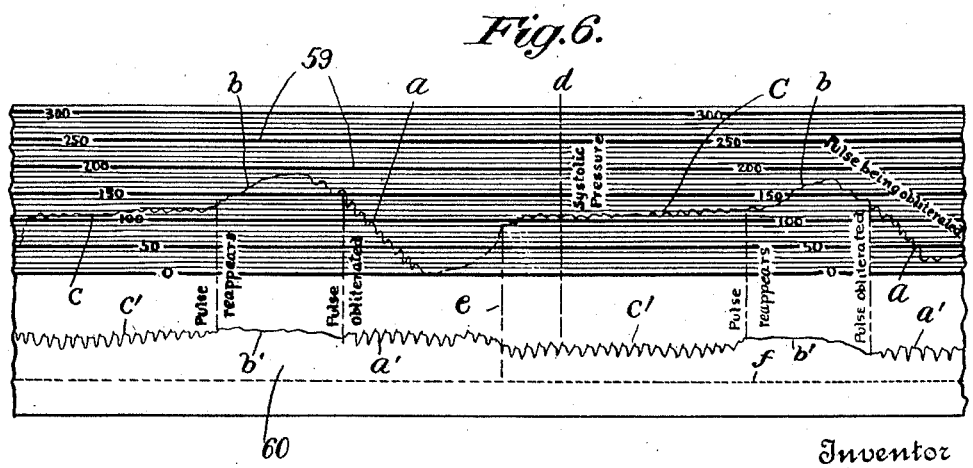

Patented Nov. 6, 1928.

1,690,671

UNITED STATES PATENT OFFICE.

CHARLES E. DRESSLER, OF NEW YORK, N. Y.

BLOOD-PRESSURE APPARATUS.

Continuation of application Serial No. 731,743, filed August 13, 1924. This application filed May 9, 1927. Serial No. 189,805.

The present invention relates to improvements in the method of and apparatus for ascertaining blood pressures, and is more especially directed to a method of and means for providing a visual indication of the conditions of the pulse so that it may be exactly determined when the maximum and minimum blood pressure is being recorded as by a graph or other medium, the present application being a continuation of my application filed August 13, 1924, Serial No. 731,743.

Heretofore, in recording apparatus of the general character illustrated and described in U. S. Letters Patent No. 1,481,084, granted to me January 15, 1924, no means was provided for accurately indicating the complete reappearance of the pulse after obliteration, the determination of this important element to a perfect test being dependent largely upon the skill of the physician or other operator.

The general object of the present invention is to provide a simple and accurate method of and means for indicating the exact period during a blood pressure test at which the maximum and minimum pressure is being observed or recorded, and thereby eliminate the uncertainties with the consequent dangers, of the methods previously followed in the making of such tests.

My invention further contemplates a simple and economical apparatus of a compact construction for portability, whereby my method may be practiced in a manner which will insure the most satisfactory results, irrespective of the skill of the practitioner.

It is also an object of my invention to generally improve the construction and dependability of the blood pressure recording apparatus of the type herein before referred to and to combine therewith a pulse condition indicator, in a manner to provide a complete unit whereby a blood pressure test may be expeditiously and accurately recorded for the purpose of preservation if that is desired.

A further object of my invention is the provision of a medium upon which a permanent record as aforesaid may be made, this medium being of a character which will facilitate the work of the operator of the apparatus and insure accuracy of the records in all cases so that comparisons may be made on a common basis and a complete history of a patient's pressure obtained.

Other objects of my invention and advantages flowing from the practicing thereof will present themselves as the description proceeds, and I would have it understood that I reserve unto myself all rights to the full range of equivalents, both in structure and uses, to which I may be entitled under my invention in its broadest aspect.

For the purposes of the present disclosure, I have elected to illustrate and describe a preferred form of apparatus whereby my method of accurately determining and recording blood pressures may be practiced. It will be understood, however, that my method may be carried out with other forms of apparatus without departing from the spirit and scope of my invention as defined by the appended claims.

In the accompanying drawings:

Figure 1 is a side elevation, partly in section, of an apparatus for indicating and recording pulse conditions and blood pressures.

Figure 2 is a view of the left half of the apparatus shown in Figure 1, looking in the direction of the arrow a.

Figure 3 is a view of the righthand section of Figure 1 looking in the direction of the arrow b.

Figure 4 is a detail of a part of the structure shown in Figure 2.

Figure 5 is a detail of the joint and locking means for coupling the two sections of the apparatus; and.

Figure 6 is an enlarged plan view of the record medium.

Referring now to the drawings in detail, in which like characters of reference are employed to designate similar parts throughout the several views, a suitable support or platform is provided, preferably formed of two sections 8 and 9 separable on a median line. On each of the sections 8 and 9 is located a standard 10 within which is telescopically mounted a rod 11, whereby the pulse condition indicating portion of the apparatus may be adjustably supported from the section 8 of the platform, while the blood pressure recording mechanism is similarly supported from the section 9 thereof. It will be apparent that the rods 11 may be locked in any desired position within the respective standards 10 by means of the screws 12; also that the said rods are removable from their standards for the purposes of disassembling the apparatus.

The housing 13 for the actuating mechanism of the apparatus is preferably of a cylindrical configuration and consists of two halves or sections 14 and 15, the open ends of which register and are adapted to be connected by a slidably mounted ring or band 16 for embracing the joint therebetween. A lock of the so-called bayonet type, embodying the pin 17 and cooperating slot 18 serves to maintain said sections relatively immovable when they are thus connected.

As will be observed, each of said sections 14 and 15 is provided with a tube or duct 19 and 20 preferably arranged as shown, the opposed ends thereof being tapered to form an interlocking joint 21 when the two sections 14 and 15 are assembled as aforesaid. A continuous air passage is thus provided from a nozzle 22 located exteriorly of the section 14 through a valve 52 to a similarly disposed nozzle 23 of the section 15, the said valve being retained within its socket 53 by means of a spring 54 yieldably engaging a shoulder 52ª on the valve and fixed to the outer wall of the housing section, as shown at 55.

To facilitate the description of the structure and method of operation of the apparatus, the pulse condition indicating unit supported from the platform section will be referred to as unit A, while the blood pressure unit carried on platform section 9 will be termed unit B.

Unit A is provided with a closed chamber 24 within which I locate a suitable diaphragm or diaphragms 25 communicating with an extension 19ª of the tube or duct 19 approximately opposite the nozzle 22, this chamber 24 being connected to the said tube or duct 19 by means of a short tube or duct 26.

Fixed upon the wall 24ª of the chamber 24 is a bracket 27 on which is pivotally supported at 30 a rod or lever 28 carrying at its lower end a scriber, such as a pen 29. This pen 29 which embodies an ink cup or reservoir 29ª, is preferably adjustably mounted on said rod or lever 28 as shown at 29ᵇ, so that the nib thereof may be moved into and out of contact with a record medium as hereinafter described.

A rod 31 having an angularly disposed bifurcated end 32 straddling the pen lever or rod 28 is rigidly secured to the center of the outermost diaphragm 25, as at 31ª, the intermediate portion of said arm 31 reciprocating in a stuffing box 33 whereby air leakage from the chamber 24 is effectually prevented. From the construction thus described, it will be evident that under the influence of the diaphragm 25, the lever 28 is capable of oscillation on its fulcrum 30 within the limits of an opening 14ª in the housing section 14.

A bracket 34 is fixed on the inner wall of unit B, said bracket 34 having an angularly disposed arm 34ª from which a rod 35 carrying a scriber pen 36 is supported by a bearing member 37 mounted for oscillation upon a shaft removably retained in the end of said arm by a set screw 39. Fixed to the upper end of said bearing member 37, as by screws 40, is a member 41 having an angular extension 42 upon which a counterbalancing weight 43 is adjustably mounted, said member 41 being pivotally connected at 44 to a link 45 which in turn is connected for oscillating motion to the upper end of a lever 46, as shown at 47.

The lower end of the lever 46 is adapted to rock upon a shaft 48 supported in the bifurcation of a bracket 49 suitably fastened to the inner wall of the housing section 15 in a position whereby said lever 46 may be engaged by a pin 50 carried by a diaphragm or diaphragms 51, which are supported in communication with an extension 20ª of the tube or duct 20.

The pen 36, similarly to pen 29, is provided with an ink cup or reservoir 36ª and is adjustably carried upon the lower end of its rod 35, which is movable within an aperture 15ª in the housing section 15.

The record receiving medium illustrated in Figure 6 preferably comprises a strip or web of flexible material, paper for instance, which may be furnished for use in the apparatus in the form of a roll adapted to be carried by any suitable means upon or within the platform 7 (which may be the carrying case for the apparatus), so that the said strip or web may be fed across the top thereof, either manually or mechanically, in a position to receive the record graphs. For example, a spring actuated feeding mechanism may be contained within the platform 7, the feeding means of which is indicated at 57, while the pressure roll for maintaining the web or strip in contact therewith is shown at 58.

For record purposes a lateral portion of the strip or web is printed or otherwise provided with a scale in connection with which to make a blood pressure record, said scale being calibrated in comparison with a standard scale of blood pressure from zero to 300 mm. Hg., this scale being preferably subdivided into six sections of 50 mm. Hg. each by means of relatively heavy lines, as shown at 59, which may be numbered if desired. A portion of the strip on one side of the zero line is blank, as shown at 60, for the purpose of making a record of pulse vibrations. Obviously, the aforesaid scale may be printed or applied to the strip prior to the use of the roll in the apparatus, or a suitable printing mechanism may be incorporated in the outfit so that the strip or web may be printed as it traverses the platform.

In the operation of my apparatus for making a record of a blood pressure test, a cushioned arm-cuff C and an inflator I of the type disclosed in my aforementioned Letters Patent are connected to the nozzles 22 and 23, respectively, by means of flexible tubing as indicated at 22ª and 23ª in Figure 1. When the cuff has been positioned on the arm or thigh of the patient, the valve 52 is manipulated to establish communication between the nozzles 22 and 23 through the connecting tubing 19, 19ª and 20 and chamber 24. The inflator is then actuated to inflate the cuff to obliterate the pulse, a uniform pressure being simultaneously built up within the chamber 24 and the diaphragms 25 and 51, as well as in the inter-communicating tubing 19, 19ª, 20 and 26, the pressure exterior of the diaphragms 51 being at atmospheric. This pressure in the cuff will cause obliteration of the pulse and the diaphragm 51 to vibrate and expand, and actuate the pen 36 of the unit B to trace a record on the strip or web as shown at a in Figure 6, it being understood that the said strip or web is now being fed across the platform 7.

During this operation of inflating the cuff the diaphragm 25 will be vibrated due to the entrance of air from the inflator into said diaphragm and the chamber 24 and the pen 29 of unit A will trace a line as indicated at $a'$. When the pulse has been entirely obliterated which the operator, a physician, can ascertain by placing the finger on the artery, the pen will have reached substantially the transverse line designated "pulse obliterated".

It is a practical impossibility for the physician to know the exact point at which the pulse is obliterated, and he therefore continues the inflation of the cuff for a further brief period. When the pulse has been completely obliterated, the valve V interposed in the inflator connection is slightly opened to release some of the pressure in the intercommunicating elements, the pens 36, 39 tracing lines on the strip or web substantially as indicated at $b, b'$, the pen 29 remaining practically inert due to the fact that the force of the pressure on both sides of the diaphragm 25 is equalized. When the air pressure has been reduced sufficiently to permit the pulse to resume the pens will have reached the transverse line with the designation "pulse re-appears" when the valve 52 is manipulated to close or shut off communication between the passage 22 and 19 through the passage 19ª with the pressure in passage 22, diaphragms 25, chamber 24, passages 26, 19 and 20 and the diaphragm 51 the same. However, the additional pressure within the diaphragms 25 caused by the pulse acting on the cuff and through the connection of the cuff with the diaphragms 25 on the column of air in the passage 22 causes a pulsation of the diaphragms 25 from within, resulting in the vibrating of said diaphragms and oscillating of the pen 29 thereby graphically recording such pulsations on the record strip or web. The pen 36 in the meantime remains on the point of the scale on the strip at the pressure and time when the valve 52 was manipulated to shut off communication between the passage 19, 19ª. It may be necessary to actuate the valve V in the inflator connection several times to release sufficient pressure from the intercommunicating elements before the proper reduction between the maximum or systolic and minimum or diastolic pressures is accurately obtained, and when this is obtained the valve 52 is manipulated to shut off communication between the passages 19, 19ª. The pulsations of the pulse, or expansion and contraction of the arteries, causes an alternate increase and decrease in the pressure on the column of air in the connection of the cuff with the diaphragms 25, which vibrates said diaphragms and the vibrations of the diaphragms are transmitted to and actuate the pen 29, the vibrations and movements of the pen increasing in amplitude in consonance with the increases in the pulsation of the re-appearing pulse, the pens tracing lines substantially of the type indicated at $c, c'$ and designated as "systolic pressure" in connection with the blood pressure record when the pulse has completely re-appeared, the systolic blood pressure indication in this instance recorded being 115 mm. Hg. It will be noted that the vibration indications in the blood pressure indications are of less amplitude than the vibrator indications of the pulse condition indications. This is due to the pulsations of the pulse through the cuff acting directly upon the diaphragm 25 and the vibrations of said diaphragms being transmitted to the diaphragms 51 through the air column connecting the chamber 24 with said diaphragms. To ascertain the diastolic blood pressure the air pressure in the intercommunicating elements is gradually reduced by opening the valve V, say at the point indicated by the transverse line $d$, the first impulse of reduced amplitude of the pulse condition indications denoting the beginning of the diastolic pressure. This reduction in pressure will permit of the pen 26 being vibrated with greater amplitude by the pulsation of the pulse through the cup and the pulse indication of greatest amplitude will indicate the actual diastolic pressure, this being indicated by the transverse line $e$ intersecting the blood pressure indicating line, the diastolic blood pressure in this instance recorded being 90 mm. Hg. This terminates the making of the blood test record when the intercommunicating elements are relieved of the air pressure by the opening of the valve V, and a successive test and record may be made.

At the conclusion of making the test and record as described, lines are drawn transversely of the record strip at the point at which the record lines indicate the obliteration of the pulse, as indicated by the line designated "pulse obliterated"; at the point where the record lines indicate the complete re-appearance of the pulse, as indicated by the line designated "pulse re-appears", on line $d$ at the beginning of the diastolic blood pressure indication, and the line $e$ at the indication of the actual diastolic blood pressure indication. However, it is not absolutely essential that these lines be applied in order to read the record since the operator may readily read the same in connection with the calibrations of the blood pressure scale on the strip. In order to make a record of a test the element of time must be taken into consideration and for this purpose there is arranged on the record strip a line arranged with time graduations, as indicated at $f$, and the feeding means 57 for the strip is constructed and arranged to feed the record strip in proper relation to said time indications.

From the foregoing, it will be obvious that the record graph produced by the pen 36 of the unit B is in itself insufficient for accurately determining the blood pressure, due to the fact that there is nothing in said record to definitely indicate when the pulse fully reappears. However, by the employment of unit A in conjunction with unit B, all uncertainties which have heretofore been inherent to the operation of apparatus of this type are removed, since the diaphragm 25 must operate in response to the action of the pulse of the patient, as opposed to a difference in pressure within and without said diaphragms, this pressure gradually changing in inverse ratio. Therefore, the precise point at which the pulse has completely reappeared may be ascertained from the instant the pen 29 of unit A produces a full strike on the record medium.

While I have described my invention with reference to the specific apparatus herein shown, it will be obvious that various modifications may be made in construction and arrangement of parts in carrying out my improved method of making blood pressure tests without departing from the scope of the invention, and that portions of the invention may be used without others and come within the scope of the invention.

Having thus described my invention I claim:

1. The combination of a diaphragm adapted to vibrate in response to blood pressure pulsations acting on one side of said diaphragm against atmospheric pressure on the other side thereof, a second diaphragm adapted to vibrate in response to the same blood pressure pulsations acting on one side of said diaphragm against a pressure greater than atmospheric pressure on the other side of said second diaphragm, and recording means actuated by said diaphragms for simultaneously recording the blood pressure pulsations and the appearance and disappearance of the pulse, the pulsations of which are recorded.

2. The combination of a diaphragm operable in response to blood pressure pulsations communicated through a column of compressed air on the one side of said diaphragm against a fixed air pressure on the other side of said diaphragm, a second diaphragm operable in response to the same blood pressure pulsations communicated through the same column of compressed air on the one side of said second diaphragm, means for varying the air pressure on the other side of said second diaphragm, and pressure recording means actuated by the said diaphragms.

3. The combination of a plurality of diaphragms, means for causing one of said diaphragms to operate in response to blood pressure pulsations with respect to atmospheric pressure, means for causing the other of said diaphragms to operate in response to the same blood pressure pulsations with respect to a different air pressure, and recording means actuated by said diaphragms for tracing separate records of the blood pressure pulsations on the said diaphragms.

4. The combination of two diaphragms, one of said diaphragms being operable in response to blood pressure pulsations with respect to atmospheric pressure on said diaphragm, the other of said diaphragms being operable in response to the same blood pressure on said diaphragm, two independently operated recording means, mechanism for operating one of said recording means by the first named diaphragm, and other means for operating the other recording means by the said second diaphragm.

5. The combination of two diaphragms, one of said diaphragms being operable in response to blood pressure pulsations with respect to atmospheric pressure on said diaphragm, the other of said diaphragms being operable in response to the same blood pressure pulsations with respect to a relatively higher air pressure on said diaphragm, means for varying said relatively higher air pressure, two independently operated recording means, mechanism for operating one of said recording means by the first named diaphragm, and other means for operating the other recording means by the said second diaphragm.

6. The combination of a recording device, a diaphragm for actuating the same to record blood pressure pulsations received by said diaphragm against a given air pressure, a second recording device, a second diaphragm for actuating said second recording device to record the same blood pressure pulsations received by said second diaphragm against a relatively higher air pressure than the first named pressure, means for varying the said relatively higher air pressure, a recording paper, and means for operating the latter to receive the records of the said two recording devices.

7. The combination of a recording device, a diaphragm for actuating the same to record blood pressure pulsations received by said diaphragm against a given air pressure, a second recording device, a second diaphragm for actuating said second recording device to simultaneously record the same blood pressure pulsations received by said second diaphragm against a relatively higher air pressure than the first named pressure, means for varying said relatively higher air pressure, a recording paper, and means for operating the latter to receive the records simultaneously of the said two recording devices.

8. In apparatus for making simultaneous records of blood pressure and pulse conditions, a traveling record medium, a pair of scribers movable transversely of said medium to inscribe parallel graphs upon said medium, and fluid pressure operated means to actuate said scribers and maintained under predetermined pressure, means operative from blood pressure pulsations acting on said fluid pressure to actuate the scribers in consonance.

9. In apparatus for making simultaneous records of blood pressure and pulse conditions, a traveling record medium, a pair of scribers movable transversely of said medium to inscribe parallel graphs upon said medium, fluid pressure operated means to actuate said scribers, means to place said fluid pressure, scriber operating means under pressure and regulate said pressure, and means operative from blood pressure pulsations to effect corresponding variations in the fluid pressure in said fluid pressure and said variations effecting actuation of the scribers in consonance therewith.

10. In apparatus for making simultaneous records of blood pressure and pulse conditions, a pair of diaphragms, means for arranging an intercommunicating fluid pressure column at one side of each diaphragm, the other side of one of said diaphragms being opened to the atmosphere, a fluid pressure chamber at the other side of the other diaphragm in intercommunication with the fluid pressure column, a pair of movable scribers, means operative from the side of the one diaphragm exposed to the fluid pressure in the chamber to actuate one scriber to indicate pulse conditions, means operative from the side of the other diaphragm exposed to atmosphere to actuate the other scriber to indicate blood pressure, and means operative from blood pressure impulses to act on the fluid pressure column to simultaneously vibrate the diaphragm in consonance with said impulses and effect actuation of the scribers.

11. In apparatus for making simultaneous records of blood pressure and pulse conditions as claimed in claim 10, means to shut off from the fluid pressure column one side of the diaphragm having the fluid pressure chamber at the other side and connecting the means operative from the blood pressure impulses to said side of said diaphragm.

Signed at the city of New York, in the county of New York and State of New York, this 28th day of April, 1927.

CHARLES E. DRESSLER.